United States Patent
Harwood et al.

[15] 3,673,067
[45] June 27, 1972

[54] REMOVAL OF MOLECULAR HALOGEN FROM SOLUTION BY PASSAGE THROUGH A MEMBRANE

[72] Inventors: William H. Harwood, Lawton; William P. Banks, Ponca City, both of Okla.

[73] Assignee: Continental Oil Company, Ponca City, Okla.

[22] Filed: Nov. 23, 1970

[21] Appl. No.: 92,301

[52] U.S. Cl.............................204/180 P, 210/23
[51] Int. Cl.........................................B01d 13/02
[58] Field of Search.......................210/24, 24 X, 21, 23; 204/180 P

[56] References Cited

UNITED STATES PATENTS

| | | | |
|---|---|---|---|
| 2,072,089 | 3/1937 | Fink | 210/23 X |
| 2,734,926 | 2/1956 | Raab et al. | 210/23 X |
| 2,924,630 | 2/1960 | Fleck et al. | 210/23 X |
| 2,987,472 | 6/1961 | Kollsman | 210/23 |
| 3,272,737 | 9/1966 | Hansen et al. | 210/23 X |

*Primary Examiner*—John H. Mack
*Assistant Examiner*—A. C. Prescott
*Attorney*—Joseph C. Kotarski, Henry H. Huth, Robert B. Colfman, Jr., Jack N. Shears and Carroll Palmer

[57] ABSTRACT

A method for removing molecules of a halogen from a solution thereof by passing the molecules into or through a membrane of polyolefinic material. The halogen molecules enter and become dissolved in the material of the polyolefinic membrane, and may be transferred through the membrane by imposing a concentration gradient across the membrane between solutions on opposite sides thereof, or, in some instances, by applying an electromotive force.

9 Claims, No Drawings

REMOVAL OF MOLECULAR HALOGEN FROM SOLUTION BY PASSAGE THROUGH A MEMBRANE

BACKGROUND OF THE INVENTION

1. Field of the Invention

This invention relates to the removal of dissolved halogen molecules from a solution or mixture thereof by passing the halogen molecules into or through a polyolefinic membrane.

2. Brief Description of the Prior Art

The separation of various materials by the selective transfer of certain of the materials through a permeable or semipermeable membrane is well-known. In dialysis techniques, the procedure is used to separate solutes as a result of their unequal rates of diffusion through selected membranes, and also to separate colloids from non-colloids. Selective transfer across membranes is also widely used to separate different ionic species. Matrices of discrete particles of certain materials, such as zeolite, are also used to separate molecular species by the formation of so-called molecular sieves through which certain species may be passed, and by which others are rejected.

BRIEF DESCRIPTION OF THE PRESENT INVENTION

The present invention provides a process by which molecular halogens can be separated from common solute materials by the selective action of a membrane in contact with the solution containing the halogen and other solutes. Broadly described, the process of the invention comprises placing a solution from which it is desired to remove dissolved halogen in contact with a polyolefinic base membrane to dissolve the halogen in the membrane. The membrane may then be removed from contact with the solution to concurrently remove the dissolved halogen. Preferably, however, the halogen from the solution, and dissolved in the membrane, is transferred through the membrane to a solvent on the opposite side of the membrane, either by osmotic pressure, or by an applied electromotive force.

In a preferred embodiment of the invention, bromine is removed from an aqueous solution by passing the bromine through an anionic boundary membrane having a polyethylene backbone containing quaternary ammonium salts into a solvent on the opposite side of the bromine. The bromine removal embodiment of the invention finds particular application in the electrochemical production of tetraethyl lead.

An object of the invention is to provide a new procedure for removing halogen molecules from aqueous solutions containing other materials which it is desired to permit to remain in solution.

A more specific object of the invention is to remove bromine from a solution containing other solute materials in addition to bromine without effecting the concurrent removal of such other solute materials.

In another aspect, an object of the invention is to provide a procedure for removing bromine from aqueous solutions thereof by a physical separation technique which does not entail the application of heat to the solution, nor selective reactivity of the bromine with a precipitating material or the like.

Additional objects and advantages of the invention will become apparent as the following detailed description of the invention is considered.

DETAILED DESCRIPTION OF PREFERRED EMBODIMENTS OF THE INVENTION

Bromine and chlorine gas are frequent constituents of mixtures in various commercial processes and it is often desirable to remove these halogens, present in the molecular form, from the solutions or mixtures in which they are located. Often, removal by distillation is impractical because of the deleterious effects suffered by the mixture or some components thereof upon elevation of temperature. Sequestration or removal by precipitation or chemical means also is frequently infeasible due to the reactivity of other solution components with the material provided for reaction with the halogen.

An example of one process in which the problem of halogen removal from solution is encountered is the electrochemical production of tetraethyl lead. In this process, tetraethyl lead is produced in an electrochemical cell in which a lead cathode is immersed in a catholyte which includes ethyl bromide, distilled water and quarternary phosphonium bromide, and a suitable electrically conducting anode is placed in a suitable anolyte solution containing certain dissolved salts. A problem which has been encountered in this process is the attack by bromine liberated at the anode of the sensitive organic membrane used to form the semipermeable barrier between the anode compartment and the cathode compartment. The bromine enters the anolyte solution at the anode and migrates in the solution to the point of contact with the barrier membrane. At this point the membrane is attacked by the bromine, and is ultimately rendered unsuitable for use in the tetraethyl lead production procedure. To the end of reducing or eliminating the attack of bromine upon the sensitive barrier membrane, it has been proposed to attempt by various means to remove bromine from the anolyte solution before an opportunity is afforded for the bromine to reach and extensively attack the membrane.

The present invention provides a new method for removing bromine and other halogens from a solution or mixture in which molecules thereof are located. The method of the invention comprises placing the solution or liquid mixture in contact with a solid membrane or diaphragm structure which includes as a predominant matrix or substrate, a polyolefinic material. The molecular halogens present in the solution or mixture in contact with such membranes or diaphragms have been found to dissolve in the polyolefinic material and to eventually pass through the membrane or diaphragm from one side thereof to the other. The halogen may be taken up in a solution disposed on the opposite side of the membrane, or the membrane may be removed after extended contact with the halogen-containing solution, thus effecting the concurrent removal with the membrane of that portion of the halogen dissolved in the membrane.

The movement of the halogen into and through the membrane can be expedited by imposing a concentration gradient across the membrane between solutions located on opposite sides thereof so as to transfer the bromine molecules under osmotic pressure. In some instances, the use of a polyolefinic membrane which has been treated to make the membrane a semipermeable anionic type, such as by treatment with quaternaryammonium salts, is a desirable technique. In this instance, an electromotive force is applied across the membrane between electrodes disposed in solutions located on opposite sides of the membrane to effect the more rapid transfer of the halogen molecules from one side of the membrane to the other.

The following examples demonstrate the practice of the invention in the removal of molecular bromine from an aqueous solution.

EXAMPLE 1

A semipermeable anionic membrane of the type sold under the tradename AMF-100 by the American Machine and Foundry Company of Stamford, Connecticut, and constituting a polyethylene substrate or backbone having a quatenary ammonium salt attached thereto, was immersed in an aqueous solution containing 5 weight per cent ammonium bromide and 3 weight per cent bromine. The membrane was retained immersed in the aqueous solution for five days. Upon removal of the membrane, it was found to contain dissolved bromine which was then completely leached out of the membrane by repeated extractions with distilled water. The membrane was not visibly damaged by this treatment.

EXAMPLE 2

An AMF-100 anionic membrane which had been immersed for five days in the ammonium bromide-bromine aqueous solution described in Example 1 was placed in a glass U-tube so as to separate the two arms of the U-tube. An aqueous solution containing 40 weight per cent acetone was then placed in one arm of the tube, and distilled water was placed in the other arm. Within a few minutes, bromine was leached out of the membrane into the acetone water solution which strongly dissolved it. After a somewhat longer time, bromine was leached out of the membrane into the distilled water solution. Following this use of the membrane in the U-tube, it was inspected and was perceived not to have been visibly damaged by the described usage.

From the described examples, it may be seen that a highly significant advantage of the method of the present invention is that a particular molecular halogen species can be removed from a complex mixture without harm to the other components in the mixture. The method can be used to particular advantage in the removal of bromine from the anolyte solution employed in an electrochemical cell used for the production of tetraethyl lead.

Although a particular embodiment of the invention has been herein described, it is to be understood that various modifications can be made in the specific exemplary structures discussed without departure from the basic principles of the invention. Modifications of this type which do not entail departures from the basic principles of the invention are therefore deemed to be circumscribed by the spirit and scope of the invention except as the same may be necessarily limited by the appended claims or reasonable equivalents thereof.

What is claimed is:

1. The method of removing molecules of halogen from a solution comprising:

placing the solution in contact with a solid membrane of predominantly polyolefinic material to dissolve halogen in the polyolefinic material; then removing the dissolved halogen from the proximity of the solution.

2. The method defined in claim 1 wherein the dissolved halogen is removed from the proximity of the solution by removing the solid membrane in which it is dissolved from contact with the solution.

3. The method defined in claim 1 wherein the dissolved halogen is removed from the proximity of the solution by placing a liquid in which the halogen is soluble on the opposite side of the membrane from said first-mentioned solution from which the halogen is to be removed; and transferring the halogen in the polyolefinic material into said liquid.

4. The method defined in claim 3 wherein said transfer is effected by osmotic pressure across the membrane.

5. The method defined in claim 3 wherein said transfer is accelerated by the application of an electromotive force across the membrane.

6. The method defined in claim 1 wherein the molecular halogen is bromine.

7. The method defined in claim 1 wherein said polyolefinic material is polyethylene.

8. The method defined in claim 7 wherein said membrane comprises a polyethylene substrate having a quaternary ammonium salt attached thereto.

9. The method defined in claim 3 wherein halogen is continuously dissolved in said polyolefinic material and transferred through said membrane to the liquid on the opposite side of said membrane from the solution from which halogen is to be removed.

* * * * *